United States Patent
Bhatia et al.

[11] Patent Number: 5,646,822
[45] Date of Patent: Jul. 8, 1997

[54] HEAT PIPE EXCHANGER SYSTEM FOR COOLING A HINGED COMPUTING DEVICE

[75] Inventors: Rakesh Bhatia, Sunnyvale; Kevin Haley, San Jose, both of Calif.

[73] Assignee: Intel Corporation, Santa Clara, Calif.

[21] Appl. No.: 521,315

[22] Filed: Aug. 30, 1995

[51] Int. Cl.⁶ ............................ G06F 1/20; H05K 7/20; F28D 15/02
[52] U.S. Cl. ............... 361/687; 361/700; 165/104.33; 174/15.2
[58] Field of Search ............ 165/80.4, 104.33, 165/104.21; 174/15.2; 361/687, 699, 700, 704, 707; 364/708.1; 62/259.2

[56] References Cited

U.S. PATENT DOCUMENTS

| | | | |
|---|---|---|---|
| 5,313,362 | 5/1994 | Hatada et al. | 361/687 X |
| 5,383,340 | 1/1995 | Larson et al. | 361/700 X |

FOREIGN PATENT DOCUMENTS 702287  3/1996  European Pat. Off. .......... G06F 1/20

*Primary Examiner*—Michael W. Phillips
*Attorney, Agent, or Firm*—Blakely, Sokoloff, Taylor & Zafman

[57] ABSTRACT

A heat pipe exchanger system for cooling a hinged computing device. The hinged computing device includes a first hinged member having a first edge and second hinged member having a second edge. The first and second hinged members are rotatably attached along the first and second edges. A heat exchange sheath is mounted substantially parallel to the first and second edges and defines a first opening and a second opening. A first heat pipe is thermally coupled to the integrated circuit and has a portion disposed within the first opening. A second heat pipe is coupled to the display housing and has a portion disposed within the second opening. Alternately, the first heat pipe is coupled to the first hinged member and has a first portion substantially parallel to the first edge and the second edge. In this case, the second heat pipe is coupled to the second hinged member and has a first portion substantially perpendicular to the first heat pipe as well as a second portion conformally engaging the first heat pipe.

7 Claims, 4 Drawing Sheets

HEAT PIPE EXCHANGER SYSTEM FOR COOLING A HINGED COMPUTING DEVICE

FIELD OF THE INVENTION

The present invention pertains to the field of the removal of heat from electronic components. More particularly, this invention relates to the removal of heat from a first computer housing member to a rotatably attached second computer housing member.

BACKGROUND OF THE INVENTION

Higher levels of integration and improved processing technology produce increasingly complex integrated circuits. These new generations of integrated circuits often operate at higher frequencies and generate more heat than their predecessors. Typically, heat sinks, fans, and heat pipes are employed to dissipate heat from integrated circuits and other electronic components. Increases in heat generation are often accommodated by simply increasing the quantity or size of these heat dissipation elements. The relatively small size of a portable computing device, however, complicates heat dissipation by limiting airflow, crowding heat generating components, and reducing the space available for heat dissipation devices.

A portable computing device typically includes two computer housing members which are rotatably coupled by a hinge. The first member, a computer base, usually has an input device such as a keyboard or a touchpad as well as a number of electronic components. Integrated circuits with the highest clock frequency are typically located in close proximity to each other within the computer base. Accordingly, there is often a region in the base having a level of heat generation greater than that of the rest of the computer.

Since the computer base size is generally kept to a minimum, and the computer base contains both the input device and numerous other electronic components, there may be inadequate space to dissipate enough heat to keep the electronic components within their acceptable range of operating temperatures. Heat dissipation through the bottom of the base is limited because the computer is usually operated on a relatively flat surface. Also, the input device (e.g. keyboard) can limit the heat flow through the top of the base. Further, since a horizontal surface is less effective at producing convective air currents to dissipate heat than is a vertical surface, the traditional horizontal operating position adds to the difficulty of dissipating heat from the computer base.

The second member, the computer display, is typically in a substantially vertical position during computer operation. The display contains an output device is such as a screen and some additional computer circuitry. In most computers, the screen and the other circuitry in the display do not generate more heat than can be dissipated given the surface area available and the relatively vertical position of the display. Thus, additional heat from the base could be dissipated in the display if transferred from the base to the display.

The main difficulty in transferring heat between the base and the display is that many efficient heat conductors such as heat pipes are not sufficiently flexible to accommodate the repetitive motion expected between the hinged base and display of a computing device. A traditional hinge, having a first and a second hinged surface each having a cylindrical portion forming a gudgeon (each gudgeon defining socket for the pin or pintle of the hinge) and a pintle (the pin on which the gudgeons turn) can transfer heat between the two hinged surfaces; however, the geometry and heat transfer capacity of a traditional hinge are not well suited for transferring heat between the base and display of a portable computing device. In a portable computing device, the region of highest heat generation is usually not immediately adjacent to, and therefore cannot be directly coupled to, a traditional hinge, thus reducing the ability to thermally couple the region of highest heat generation in the base to the display.

Two techniques for heat transfer through a hinge of a portable computing device are discussed in U.S. patent application Ser. No. 08/441,969 filed May 16, 1995 which is assigned to the present assignee. These techniques generally involve heat transfer through a coiled heat transfer element and through a gudgeon and a pintle of a hinge.

Heat transfer through a hinge is improved by increasing the hinge mass and by using more expensive, highly conductive materials, however, the increased weight and cost are seldom justified. Such a prior art technique is discussed in "Low Torque Hinged Heat Transfer Joint" (U.S. Pat. No. 5,129,448) which proposes heat transfer from a first to a second flat surface of a hinge using numerous interleaved fingers having a special heat conductive low friction coating allowing maximal surface area contact. This technique which transfers heat between the rotatable flat surfaces of a hinge may be geometrically incompatible and undesirably heavy and expensive for use in some portable computing devices.

SUMMARY

A hinged computing device is described. The hinged computing device includes a base which has a base edge and contains an integrated circuit. A display housing has a display housing edge which is rotatably attached to the base edge to allow hinging motion between the base and the display housing. A heat exchange sheath is mounted substantially parallel to the base edge and the display housing edge and defines a first opening and a second opening. A first heat pipe is thermally coupled to the integrated circuit and has a portion disposed within the first opening. A second heat pipe is coupled to the display housing and has a portion disposed within the second housing.

Also described is a hinged computing device including a first hinged member having a first edge and a second hinged member having a second edge. The first and second hinged members are rotatably attached along the first edge and the second edge. A first heat pipe coupled to the first hinged member has a first portion substantially parallel to the first edge and the second edge. A second heat pipe coupled to the second hinged member has a first portion substantially perpendicular to the first heat pipe as well as a second portion conformally engaging the first heat pipe.

BRIEF DESCRIPTION OF THE FIGURES

The present invention is illustrated by way of example and not limitation in the figures of the accompanying drawings.

DETAILED DESCRIPTION OF THE INVENTION

An apparatus for heat dissipation is described. In the following description, numerous specific details are set forth in order to provide a thorough understanding of an embodiment of the present invention. It will be apparent to those skilled in the art that the present invention may be practiced without these specific details.

Figure 1:
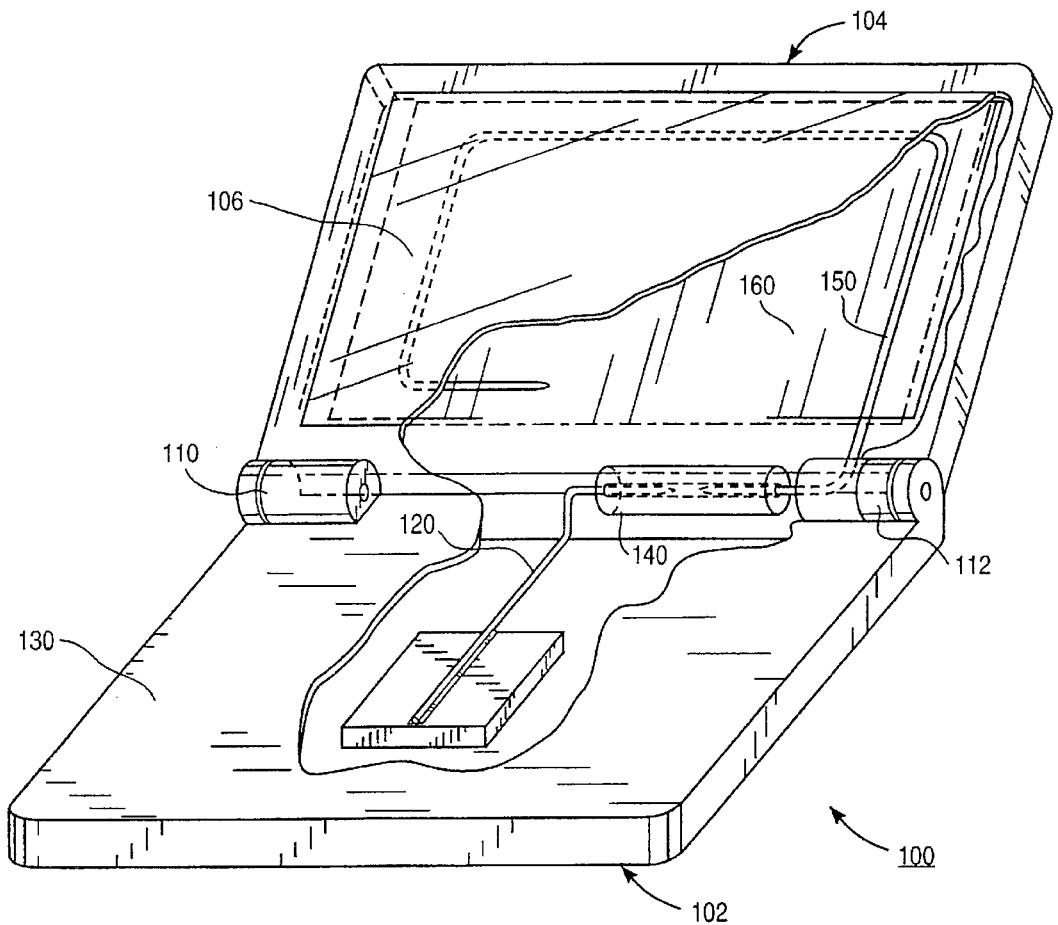
FIG. 1 is an elevation view of a computer with a partial cutaway section which incorporates an embodiment of the present invention.
Figure 2:
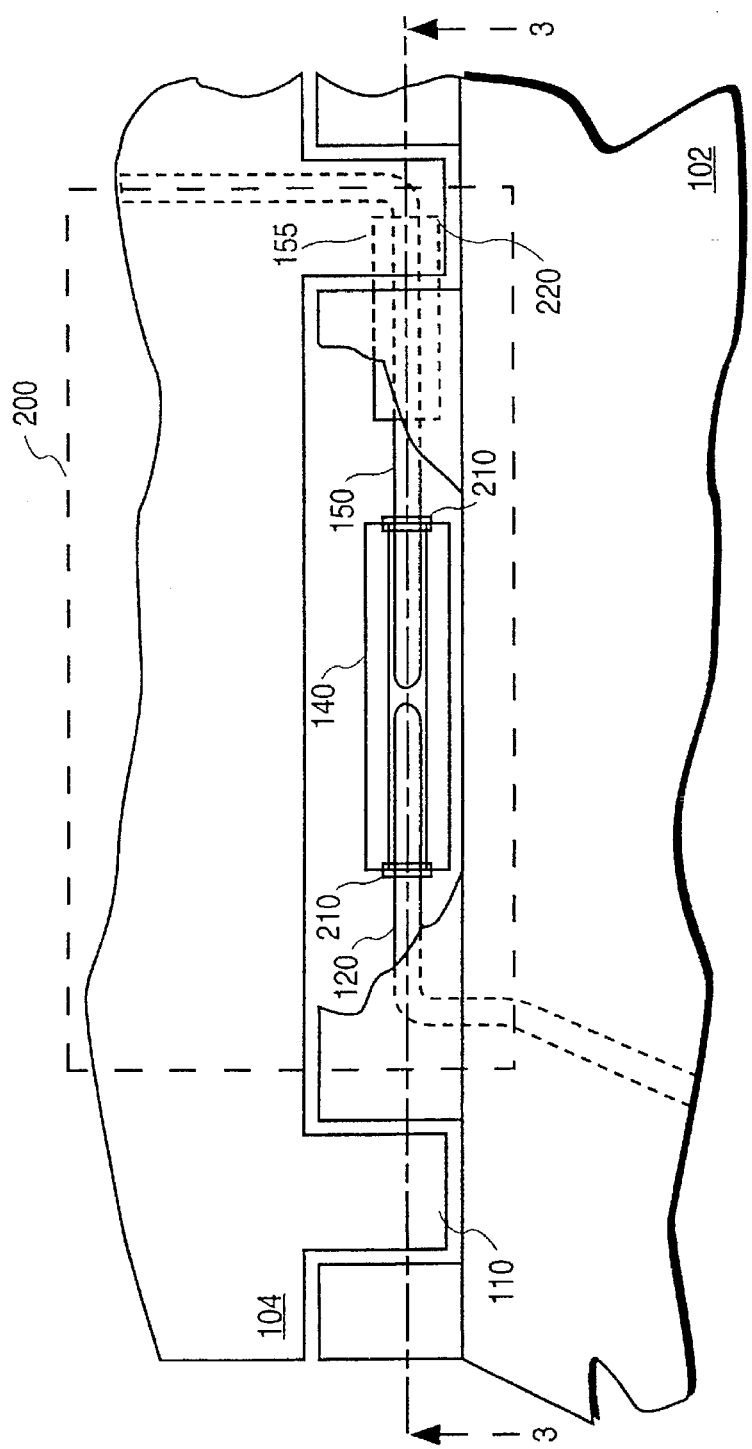
FIG. 2 is a cross sectional elevation view of a computer with a cutaway section which incorporates an embodiment of the present invention.
Figure 3:
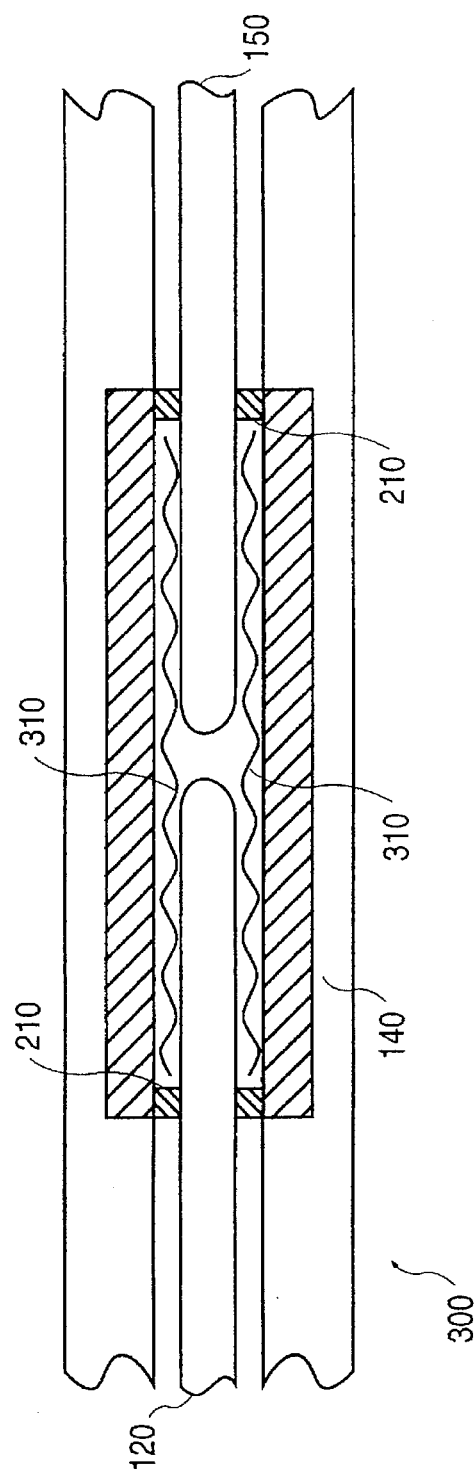
FIG. 3 is a partial cross sectional elevation view of the computer of FIG. 2 taken through the section lines 3—3 of FIG. 2.

The present disclosure describes a heat exchanger system for cooling a hinged computing device. FIG. 1 displays one such hinged computing device and illustrates an embodiment allowing hinging motion between two hinged computer members without subjecting either of a first and a second heat pipe to repetitive bending motion. In FIG. 1, a heat exchange linkage comprises a heat exchange sheath 140 which allows heat exchange between one heat pipe 120 and another heat pipe 150, both of which are stationary with respect to their associated hinged computer members. Details of this system are shown in FIGS. 2 and 3.

Figure 4A:
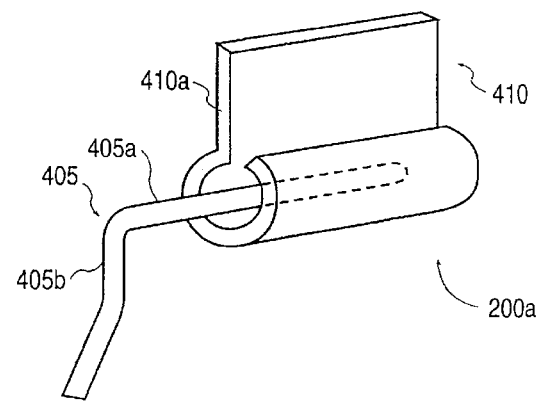
FIG. 4a is one alternate embodiment of the heat exchange linkage illustrated in FIG. 2.
Figure 4B:
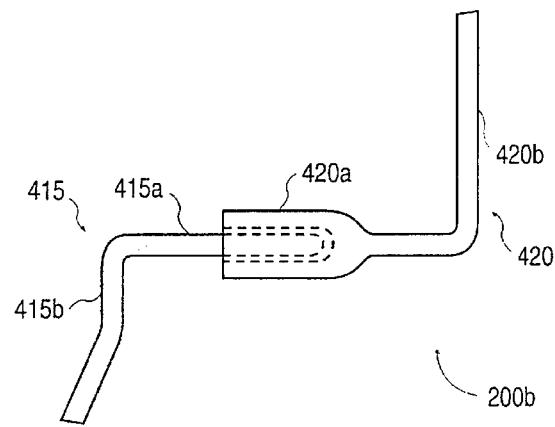
FIG. 4b is a second alternate embodiment of the heat exchange linkage illustrated in FIG. 2.
Figure 4C:
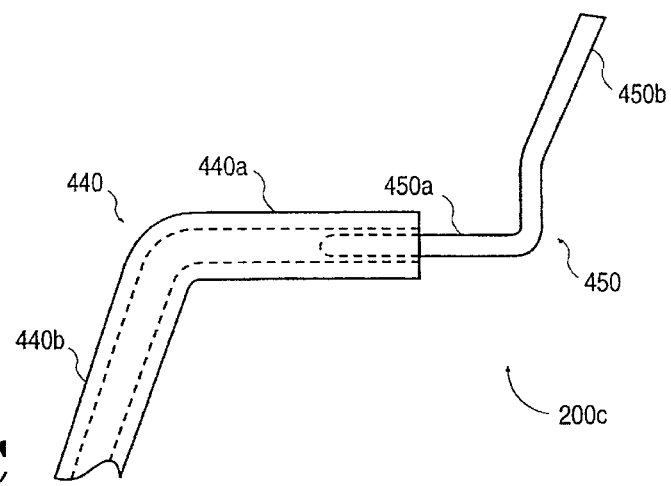
FIG. 4c is a third alternate embodiment of the heat exchange linkage illustrated in FIG. 3.

Alternate heat exchange linkages are shown in FIGS. 4a–4c. In each of these heat exchange linkages one of a first and second heat pipe conformally engages the other, allowing heat transfer as well as relative rotational motion. These systems advantageously reduce the number of parts required for the heat exchange linkage.

Returning to FIG. 1, a hinged computing device 100 of the present invention is illustrated. This hinged computing device 100 may be a laptop or notebook computer, an organizer, or a personal digital assistant. The hinged computing device 100 comprises a first computer housing member having a first edge and a second computer housing member having a second edge. The first and second computer housing members are rotatably attached along the first and second edges such that a hinging axis is formed parallel to the first and second edges. A display housing 104 forms the first computer housing member, and a base 102 forms the second computer housing member.

The display housing 104 includes a display 106 and the heat pipe 150. As shown, the heat pipe 150 enters the bottom of the display housing 104 and continues to substantially encircle a portion of the display. This arrangement allows heat to be evenly spread throughout the display housing 104. A heat dissipation plate 160 may be included when more even heat distribution is desired.

Two hinges 110 and 112 attach the display housing 104 to the base 102. These hinges not only allow hinging motion between the display housing 104 and the base 102, but also typically allow power and signal lines to be connected between the base 102 and the display housing 104. A central shaft provides an axis of rotation between the display housing 104 and the base 102. Signals and power supply cables leave one hinged member, pass through the central shaft, and enter the other hinged member.

Similarly to signal and power transmission, the central shaft may be used for heat transfer. In the embodiment of FIG. 1, the hinge 110 can be used for signal transmission while the hinge 112 transfers heat. Alternately, a separate hinge section could be provided for heat transfer, or a hinge section could provide both heat transfer and signal transmission.

In the embodiment of FIG. 1, a closed-ended portion of the heat pipe 150 is disposed along the axis of the central shaft, allowing it to transfer heat from the heat exchange sheath 140 to the display housing 104. The heat exchange sheath 140 is typically made of a good heat conductor such as copper or aluminum. Alternately, the sheath 140 could be a hollow heat pipe.

The heat exchange sheath 140 is mounted along the axis of rotation which is substantially parallel to the attached edges of the base 102 and the display housing 104. A closed-ended portion of the heat pipe 120 is disposed within a first opening defined by the sheath, and a portion of the heat pipe 150 is disposed within a second opening also defined by the sheath. In this embodiment, the heat pipe 120 and the heat pipe 150 are cylindrical, and the sheath 140 forms a cylindrical bore between the first and the second opening. The sheath 140 provides thermal coupling between the heat pipes 120 and 150 while allowing relative rotation along the axes of these heat pipes. That is, the heat pipes can rotate independently along the same axis. Thus, heat transfer can occur without repetitive bending of either heat pipe when the display housing is rotated relative to the base.

Heat is transferred from the base 102 using the heat pipe 120 which extends into the base 102 and is thermally coupled to an integrated circuit 130. The heat pipe 120 could alternately be coupled to a circuit board, a card in the computer, or another heat generating computer component.

FIG. 2 illustrates further details of an embodiment of the present invention. In general, the components including the heat pipe 120, the sheath 140, and the heat pipe 150 are indicated as part of a heat exchange linkage 200. As shown, a hinge 220 provides a mechanism for the heat pipe 150 to enter the display housing 104. The hinge 220 includes both the heat pipe 150 and a supportive shaft 155 so that the heat pipe 150 need not provide structural support. In this embodiment, the heat pipe 150 is partially disposed within the supportive shaft 155.

In another embodiment, the hinge 220 is an additional hinge section included to allow heat transfer between the base and the display housing. In this embodiment the hinge 110 and a second structural hinge (not shown) attach the base 102 to the display housing 104.

Heat pipes 120 and 150 and sheath 140 may be sufficiently hardened with a material such as molybdenum such that no lubricant is required to prevent unacceptable wear. The embodiment of FIG. 2 includes seals 210 encapsulating a bore defined by the sheath 140. This arrangement allows for the use of a lubricant to reduce mechanical wear.

Further details of the heat exchange linkage 200 are illustrated in FIG. 3. A linkage enclosure 300 is typically formed in molded plastic and defines a narrow bore for heat pipe 120 and heat pipe 150 and a wider bore for sheath 140. The linkage enclosure 300 typically also includes the previously mentioned signal and power cables. Here a grease 310 is included in the bore of sheath 140 for mechanical lubrication and improved thermal conduction. Seals 210 encapsulate the grease 310 within the sheath 140. Thus, the system provides reliable heat transfer while allowing repetitive motion between two hinged members.

One alternate heat exchange linkage is shown in FIG. 4a. This embodiment includes a first heat pipe 405 which has a first portion 405a forming a shaft, and a second portion 405b substantially perpendicular to the shaft. A second heat pipe 410 has a first portion 410a substantially perpendicular to the shaft and second portion 410b forming a journal at least partially coiled around the shaft. As used in the hinged computing device, the shaft 405a is substantially parallel to the hinging axis. The embodiment of FIG. 4a can be configured to have heat pipe 410 extending either into the base 102 or the display housing 104. Correspondingly, the heat pipe 405 will extend into the display housing or the base.

This arrangement, with one heat pipe conformally engaging another heat pipe, allows an effective heat linkage system with fewer parts. As previously, the heat pipes may be coated with a hardened coating, or a lubricant and seal may be used to reduce mechanical wear.

FIG. 4b illustrates another system where one heat pipe conformally engages another heat pipe. A heat pipe 415 has a first portion 415a forming a shaft and a second portion 415b substantially perpendicular to the shaft. Another heat pipe 420 has a first portion 420a which forms a receptacle surrounding the first portion of the heat pipe 415. The heat pipe 420 also has a second portion 420b which is substantially perpendicular to the shaft. The first portion 420a of the heat pipe 420 forms the receptacle by widening to define a bore which the first portion 415a of the heat pipe 415 is disposed within.

Preferably, the heat pipe 415 is substantially cylindrical and the bore defined by heat pipe portion 420a is also substantially cylindrical, thereby allowing efficient thermal transfer and minimizing mechanical wear. Again, if necessary a lubricant may be used within the bore defined by the heat pipe portion 420a.

FIG. 4c illustrates another embodiment of the heat exchange linkage. In this embodiment, a heat pipe 440 conformally engages another heat pipe 450. A first portion 450a of the heat pipe 450 forms a shaft which is at least partially surrounded by a portion 440a of the heat pipe 440. The heat pipe 440 has a hollow center conforming to the other heat pipe 450. A second portion 440b of the heat pipe 440 and a second portion 450b of the heat pipe 450 are both substantially perpendicular to the shaft. In use in the hinged computing device, the shaft 450a remains substantially parallel to the hinged axis; however, either the heat pipe 450 or 440 could extend into the base, the other extending into the display.

The described heat pipes are presently available from heat pipe manufacturers such as Thermacore of Lancaster, Pa. Flat heat pipes exist which can be bent to form a journal as pictured in FIG. 4a. Additionally, heat pipes defining a bore such as those in FIGS. 4b and 4c are presently available.

Thus, heat may be reliably transferred between members of a hinged computing device. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hinged computing device comprising:
    a base having a base edge and containing an integrated circuit;
    a display housing having a display housing edge, the display housing edge being rotatably attached to the base edge allowing hinging motion between the display housing and the base;
    a heat exchange sheath mounted substantially parallel to the base edge and the display housing edge, the heat exchange sheath defining a first opening and a second opening;
    a first heat pipe thermally coupled to the integrated circuit and having a portion with a first closed end disposed within the first opening; and
    a second heat pipe coupled to the display housing and having a portion with a second closed end disposed within the second opening.

2. The hinged computing device of claim 1 wherein the heat exchange sheath is a cylinder defining a cylindrical bore extending from the first opening to the second opening.

3. The hinged computing device of claim 2 wherein the cylindrical bore contains a thermally conductive grease and a seal at each of the first and second opening encapsulates the thermally conductive grease within the cylindrical bore.

4. The hinged computing device of claim 1 wherein the display housing contains a heat dissipation plate thermally coupled to the second heat pipe.

5. The hinged computing device of claim 1 wherein the first and second heat pipes and the heat exchange sheath have a hardened coating.

6. The hinged computing device of claim 1 wherein the portion of the first heat pipe and the portion of the second heat pipe are substantially parallel to the base edge and the display housing edge.

7. A hinged computing device comprising:
    a first hinged member having a first edge;
    a second hinged member having a second edge rotatably attached to the first edge of the first hinged member;
    a first heat pipe coupled to the first hinged member, the first heat pipe having a first closed end;
    a second heat pipe coupled to the second hinged member, the second heat pipe having a second closed end; and
    heat exchange linkage means for thermally coupling the first closed end of the first heat pipe to the second closed end of the second heat pipe and allowing hinging motion between the first and second hinged members.

* * * * *